US011548072B2

(12) United States Patent
Deno

(10) Patent No.: US 11,548,072 B2
(45) Date of Patent: Jan. 10, 2023

(54) MACHINE TOOL

(71) Applicant: STAR MICRONICS CO., LTD., Shizuoka (JP)

(72) Inventor: Masatoshi Deno, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 179 days.

(21) Appl. No.: 17/062,785

(22) Filed: Oct. 5, 2020

(65) Prior Publication Data

US 2021/0016358 A1    Jan. 21, 2021

Related U.S. Application Data

(63) Continuation of application No. PCT/JP2018/048021, filed on Dec. 27, 2018.

(30) Foreign Application Priority Data

Apr. 25, 2018  (JP) .............................. JP2018-083933

(51) Int. Cl.
*B23B 7/06*    (2006.01)
(52) U.S. Cl.
CPC ..................................... *B23B 7/06* (2013.01)
(58) Field of Classification Search
CPC .. B23B 7/06; B23B 7/10; B23Q 11/08; B23Q 11/0825; B23Q 2705/102; B23Q 5/40
See application file for complete search history.

(56) References Cited

U.S. PATENT DOCUMENTS

| 5,871,283 | A  | 2/1999 | Isobe et al. |
|---|---|---|---|
| 2013/0163188 | A1 | 6/2013 | Lee et al. |
| 2014/0083244 | A1 | 3/2014 | Segawa |
| 2017/0113279 | A1 | 4/2017 | Kawarasaki |

(Continued)

FOREIGN PATENT DOCUMENTS

| CN | 103176528 | 6/2013 |
|---|---|---|
| CN | 206677657 | 11/2017 |
| GB | 316469 | 8/1929 |

(Continued)

OTHER PUBLICATIONS

SIPO, Office Action of CN 201880085187.6 dated May 28, 2021.
EPO, Search Report of EP 18916013.8 dated Nov. 24, 2021.

*Primary Examiner* — Alan Snyder
(74) *Attorney, Agent, or Firm* — Lex IP Meister, PLLC

(57) ABSTRACT

Provided is a machine tool capable of facilitating switching moving ranges of the moving unit. A moving-side cover provided on the moving unit covers part of a position of the driving apparatus in the moving direction. A supporting-side cover is provided in a position on a side of the first moving range of an end of the moving-side cover on a side of the second moving range in the moving direction to continuously cover the part of the position of the driving apparatus in the moving direction in cooperation with the moving-side cover in the first use state. The supporting-side cover forms a clearance in the moving direction with respect to the moving-side cover in the second use state. A slide cover is mounted on one of supporting-side cover and the moving-side cover slidably in the moving direction to close the clearance when slidably drawn out in the moving direction.

6 Claims, 9 Drawing Sheets

(56) References Cited

U.S. PATENT DOCUMENTS

2018/0236622 A1   8/2018   Ito

FOREIGN PATENT DOCUMENTS

| JP | H07-60593 | 3/1995 | | |
|---|---|---|---|---|
| JP | 2014-65083 | 4/2014 | | |
| JP | 2016-36882 | 3/2016 | | |
| JP | 2016144843 A * | 8/2016 | ............. | B23B 13/12 |
| JP | 2017-136646 | 8/2017 | | |

* cited by examiner

MACHINE TOOL

CROSS-REFERENCE TO RELATED APPLICATION

The present application is a continuation of PCT Application No. PCT/JP2018/048021, filed on Dec. 27, 2018, which claims priority of Japanese Patent Application No. 2018-083933 filed on Apr. 25, 2018. The contents of this application are incorporated herein by reference in their entirety.

BACKGROUND

(a) Field

The present invention relates to a machine tool having a moving unit movable with respect to a supporting unit to machine a workpiece.

(b) Description of the Related Art

A machine tool includes a well-known lathe of slidable spindle type having a guide bush provided in front of a spindle to slidably support a workpiece. A driving apparatus for moving a headstock provided with the spindle in a spindle axis direction includes a ball screw having a threaded shaft extended along a spindle axis and a nut, a slidable guide structure having a rail and a guide, and a servo motor for rotating the threaded shaft. The headstock is provided with, for example, a ball screw cover for protection, for safety, and for prevention of workpiece chips spreading over the ball screw.

Japanese Patent Application Publication No. 2017-136646 discloses a lathe of slidable spindle type having a first front cover screwed to the headstock, a second front cover screwed to a front end supporting unit rotatably holding a front end of a driving mechanism when a guide bush is used, and a rear cover screwed to the headstock. The driving mechanism provided in front of the spindle is thereby covered by the first front cover and the second front cover. The moving range of the headstock in the spindle axis direction is on the further front side when the guide bush is not used compared to when the guide bush is used. The second front cover is removed from the front end supporting unit when the guide bush is not used and screwed to a rear end supporting unit rotatably holding the rear end of the driving mechanism. The second front cover thereby acts as a common cover covering part of the driving mechanism provided behind the headstock. The driving mechanism provided behind the headstock is covered by the rear cover and the second front cover.

SUMMARY

In switching the state that the guide bush is used to the state that the guide bush is not used, the second front cover is necessarily removed from the front end supporting unit by loosening a screw and then the removed second front cover is necessarily attached to the rear end supporting unit by fastening a screw. In switching the state that the guide bush is not used to the state that the guide bush is used, the second front cover is necessarily removed from the rear end supporting unit by loosening the screw and then the removed second front cover is necessarily attached to the front end supporting unit by fastening the screw.

It would be convenient to facilitate the work of switching between the state that the guide bush is used and the state that the guide bush is not used. Such convenience widely applies to a machine tool provided with a moving unit having different moving ranges between the first use state and the second use state.

The present invention discloses a machine tool capable of facilitating the work of switching moving ranges of the moving unit.

A machine tool of the invention comprises a driving apparatus provided on a supporting unit. The driving apparatus has a supporting-side engaging member provided along a moving direction of a moving unit. The machine tool further comprises a moving-side engaging member provided on the moving unit movably in the moving direction to be engaged with the supporting-side engaging member. The moving unit moves in the moving direction to machine a workpiece in a first moving range in a first use state and in a second moving range different from the first moving range in a second use state. The machine tool further comprises a moving-side cover provided on the moving unit to cover part of a position of the driving apparatus in the moving direction and a supporting-side cover provided in a position on a side of the first moving range of an end of the moving-side cover on a side of the second moving range in the moving direction to continuously cover the part of the position of the driving apparatus in the moving direction in cooperation with the moving-side cover in the first use state. The supporting-side cover forms a clearance in the moving direction with respect to the moving-side cover in the second use state. A slide cover is mounted on a companion cover slidably in the moving direction to close the clearance when slidably drawn out in the moving direction from the companion cover in the second use state. The companion cover is one of supporting-side cover and the moving-side cover.

The invention provides a machine tool capable of facilitating the work of switching the moving ranges of the moving unit.

DETAILED DESCRIPTION

Figure 1:
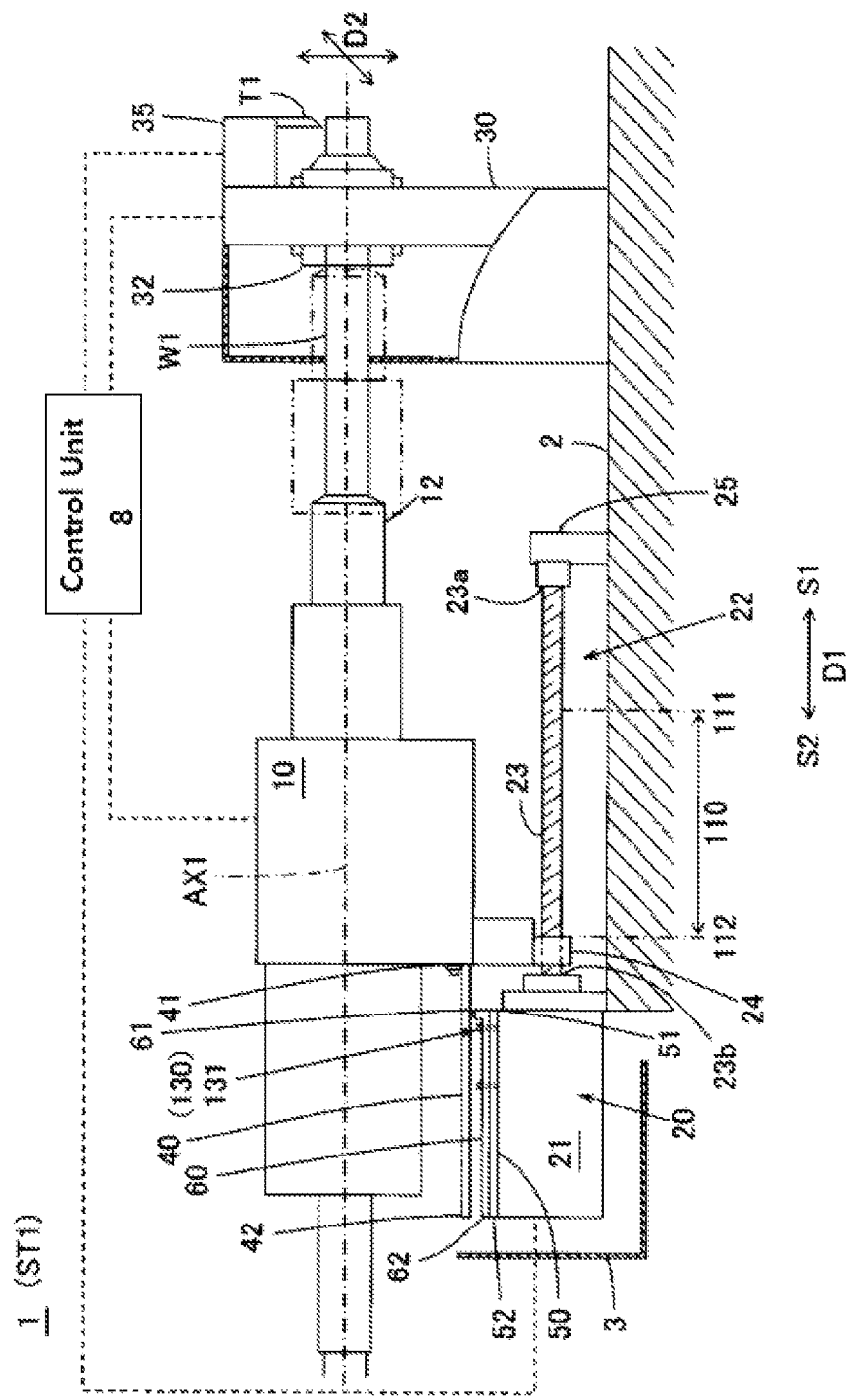
FIG. 1 is a partial sectional front view schematically showing part of a lathe when a spindle is in the most retracted position in the state that a guide bush is mounted.

Hereinafter, an embodiment of the present invention will be described. The invention is not limited to the exemplary embodiment and the features disclosed herein are not necessarily essential to the invention.

(1) Summary of Inventive Technology

Technology of the invention will be described with reference to FIG. 1 to FIG. 9B. The drawings only schematically show an example of the invention. They may have a mismatch to each other due to different maginification in each direction. Each element denoted by a symbol is only an example.

Embodiment 1

A machine tool of the invention (a lathe 1) may comprise a driving apparatus 20 provided on a supporting unit (a bed 2), a supporting-side engaging member (a threaded shaft 23) of the driving apparatus 20 provided along a moving direction (a spindle axis direction D1) of a moving unit (a headstock 10), a moving-side engaging member (a nut 24) provided on the moving unit (10) movably in the moving direction (D1) to be engaged with the supporting-side engaging member (23). The moving unit (10) may move in the moving direction (D1) to machine a workpiece W1 in a first moving range 110 in a first use state ST1 (a state that a guide bush 32 is used) and in a second moving range 120 different from the first moving range 110 in a second use state ST2 (a state that the guide bush 32 is not used).

The moving range (110, 120) may represent a moving range of a predetermined point of the moving unit (10) by using the predetermined point as a reference. The length of the moving unit in the spindle axis direction may be excluded. The front end of the nut 24 is used as the reference to show the moving ranges in FIG. 1 to FIG. 4. The position corresponding to a front end 41 of a moving-side cover 40 is used as the reference to show the moving ranges in FIG. 7.

The machine tool may further comprise the moving-side cover 40, a supporting-side cover 50, and a slide cover 60. The moving-side cover 40 may be provided on the moving unit (10) to cover part of a position of the driving apparatus 20 in the moving direction (D). In the first use state ST1, the supporting-side cover 50 may be provided in a position on a side of the first moving range 110 (on the rear side) of the end 41 of the moving-side cover 40 on a side of the second moving range 120 (on the front side) in the moving direction (D1) to continuously cover part of the position of the driving apparatus 20 in the moving direction (D1) in cooperation with the moving-side cover 40. In the second use state ST2, a clearance CL1 may be formed between the supporting-side cover 50 and the moving-side cover 40 in the moving direction (D1). The slide cover 60 may be mounted on one of the supporting-side cover 50 and the moving-side cover 40 (the supporting-side cover 50 in FIG. 7) slidably in the moving direction (D1) to close the clearance CL1 when slidably drawn out in the moving direction (D1) in the second use state ST2.

The supporting-side cover 50 may be provided in a position on the side of the first moving range 110 (on the rear side) of the end 41 of the moving-side cover 40 on the side of the second moving range 120 (on the front side) in the moving direction (D1). In the first use state ST1 that the moving unit (10) moves in the moving direction (D1) in the first moving range 110, the supporting-side cover 50 and the moving-side cover 40 may continuously cover part of the position of the driving apparatus 20 in the moving direction (D1). In the second use state ST2 that the moving unit (10) moves in the moving direction (D1) in the second moving range 120, there may be formed the clearance CL1 between the supporting-side cover 50 and the moving-side cover 40 in the moving direction (D1). The clearance CL1 may be closed by the slide cover 60 drawn out in the moving direction (D1) from a companion cover, which is one of the supporting-side cover 50 and the moving-side cover 40. The supporting-side cover 50, the slide cover 60, and the moving-side cover 40 may continuously cover part of the driving apparatus 20.

The above structure prevents cut chips of the workpiece W1 going to the driving apparatus 20 for improved protection and safety. The slide cover 60 contributes to a reduction in size of the supporting-side cover 50 and the moving-side cover 40 in the moving direction (D1), resulting in a reduction in machine dimensions in the moving direction (D1).

Furthermore, the first use state ST1 can be switched to the second use state ST2 by a simple operation of only drawing out the slide cover 60 from the companion cover. The second use state ST2 can be switched to the first use state ST1 by a simple operation of only sliding the slide cover 60 over the companion cover. The embodiment provides a machine tool capable of facilitating the work of switching the moving ranges of the moving unit.

The moving unit may include a headstock and a tool post. The headstock may include a front headstock and a back headstock. The supporting unit may include a bed of the machine tool and a table movably mounted on the bed.

The supporting-side engaging member may be a separate member mounted on the supporting unit or may be integrally formed therewith.

The moving-side engaging member may be a separate member mounted on the moving unit or may be integrally formed therewith.

The combination of the supporting-side engaging member and the moving-side engaging member may include a driving mechanism for driving the moving unit in the moving direction and a guide mechanism for guiding the moving unit in the moving direction. Particularly, the combination includes a combination of a threaded shaft and a nut, a combination of a rail and a guide, and a combination of a dovetail groove and a dovetail.

The cover may directly cover part of the position of the driving apparatus. The cover may indirectly cover the driving apparatus through another member (another cover). Covering part of the position of the driving apparatus includes covering part of the area where the driving apparatus is located. When the cover is provided above the driving apparatus, the cover may overlap part of the area where the driving apparatus is located in a planar view as shown in FIG. 1 to FIG. 5.

The supporting-side cover may be mounted on a motor of the driving mechanism or may be mounted on the supporting unit. The supporting-side cover may be a housing of the motor.

The moving-side cover may be detachably mounted on the moving unit. The moving-side cover may be mounted on a metal fitting provided on the moving unit. The moving-side cover may be integrally formed with the moving unit.

The supporting-side cover may be detachably mounted on a base including the motor and the supporting unit. The supporting-side cover may be mounted on a metal fitting provided on the base. The supporting-side cover may be integrally formed with the base. The above remarks may apply to the following embodiments.

Embodiment 2

The companion cover of the slide cover may be the supporting-side cover 50 as shown in FIG. 1 to FIG. 4. The slide cover mounted on the supporting-side cover 50 does not move. That needs only a lightweight mechanism for mounting the slide cover and contributes to a reduction in driving energy for the moving unit.

Embodiment 3

The machine tool (1) may comprise a positioning structure 130 for positioning the slide cover 60 in a position adapted to one of the first use state ST1 and the second use state ST when slid in the moving direction (D1) with respect to the companion cover. The embodiment provides a machine tool capable of further facilitating the work of switching the moving ranges of the moving unit.

Embodiment 4

The moving unit (10) may be provided with a spindle 12 rotatable along with the workpiece W1 on a spindle axis AX1 along the moving direction (D1). The machine tool (1) may further comprise a supporting bed 30 where the guide bush 32 is detachably mounted in front of the spindle 12 to slidably support the workpiece W1. The first use state ST1 may be a state that the guide bush 32 is mounted on the supporting bed 30. The second use state ST2 may be a state that the guide bush 32 is removed from the supporting bed 30. The second moving range 120 may be nearer the supporting bed 30 than the first moving range 110 is. The embodiment facilitates the work of switching the state that the guide bush is used and the state that the guide bush is not used.

(2) Hardware Configuration of the Machine Tool

Figure 2:
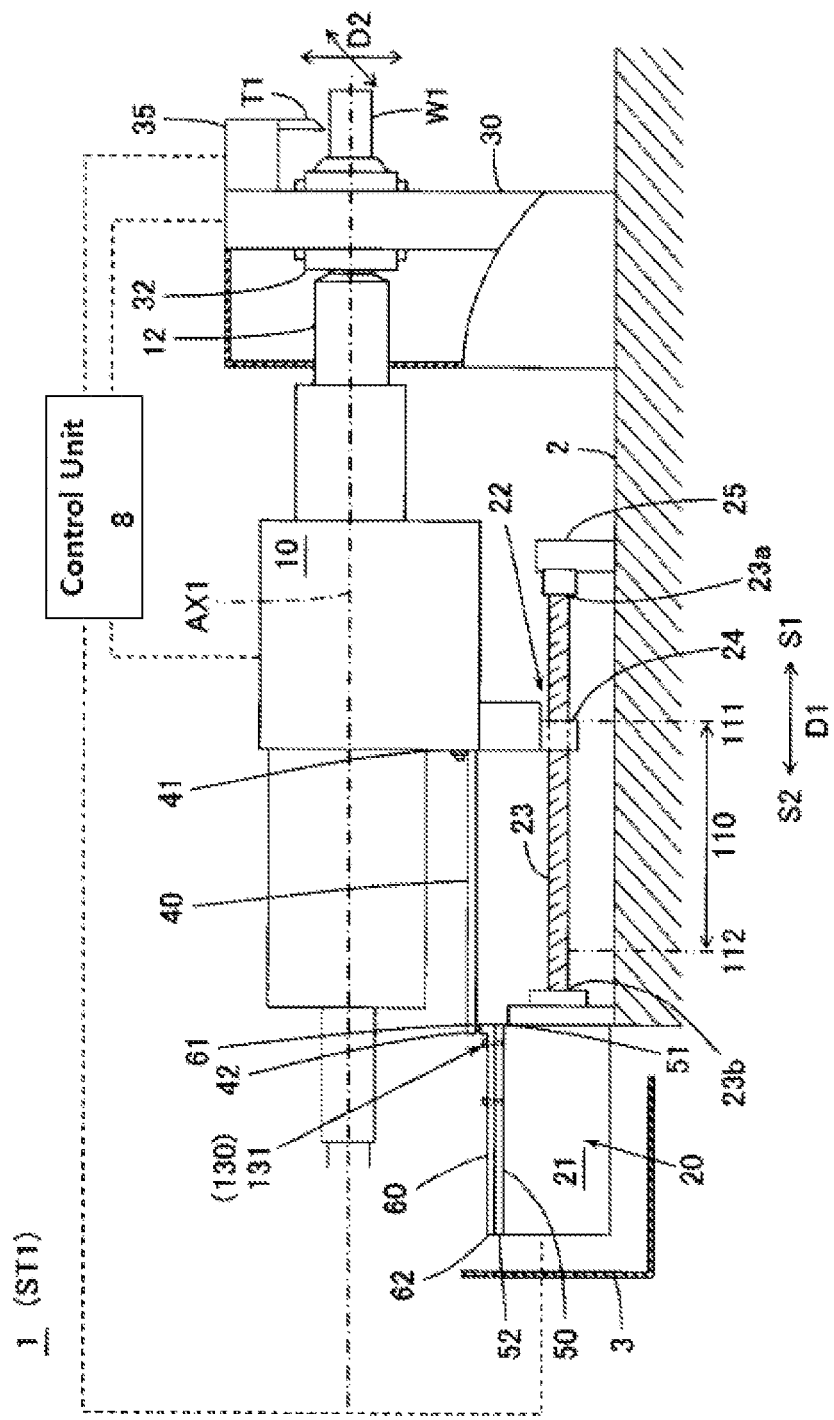
FIG. 2 is a partial sectional front view schematically showing part of a lathe when a spindle is in the most advanced position in the state that a guide bush is mounted.
Figure 3:
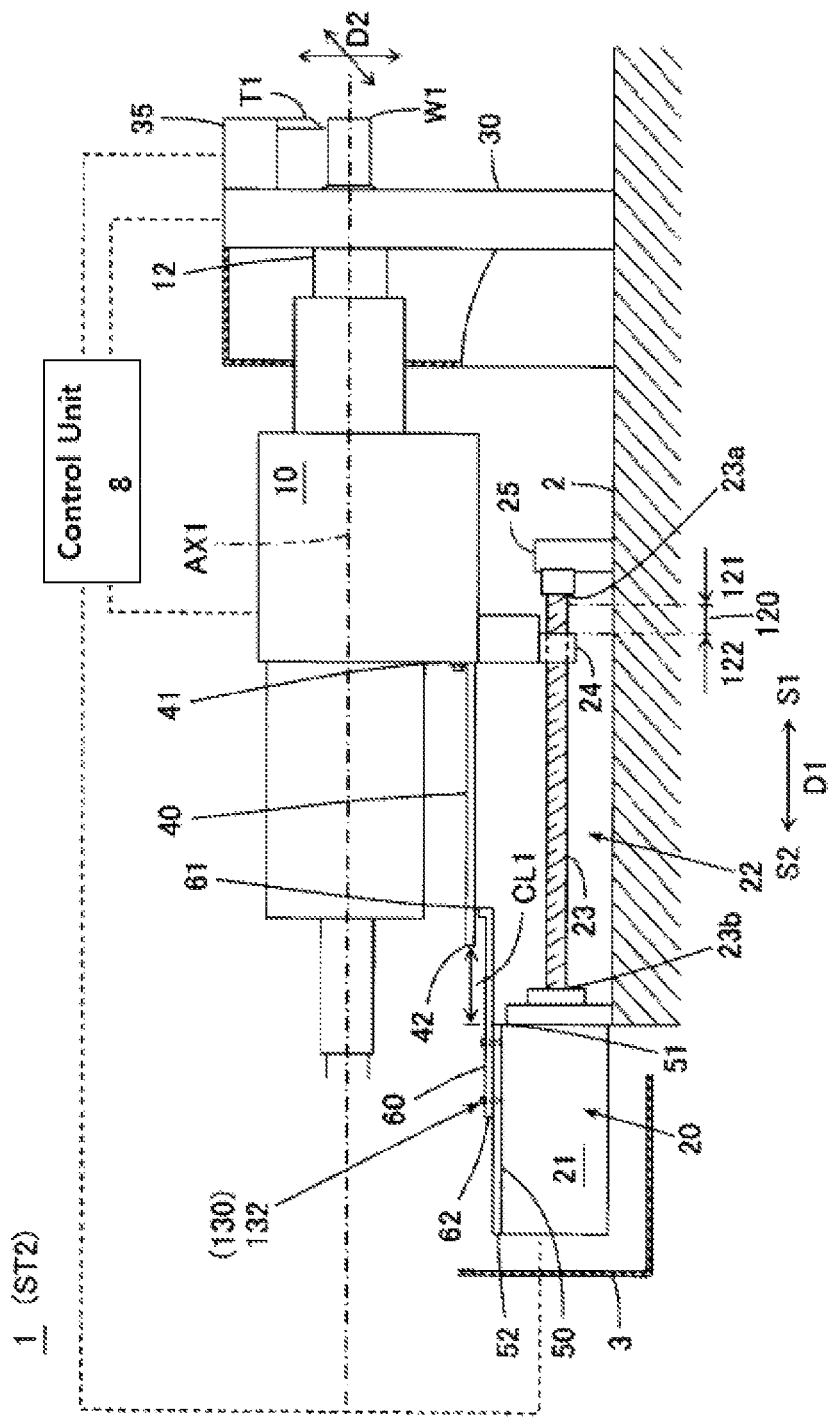
FIG. 3 is a partial sectional front view schematically showing part of a lathe when a spindle is in the most retracted position in the state that a guide bush is removed.
Figure 4:
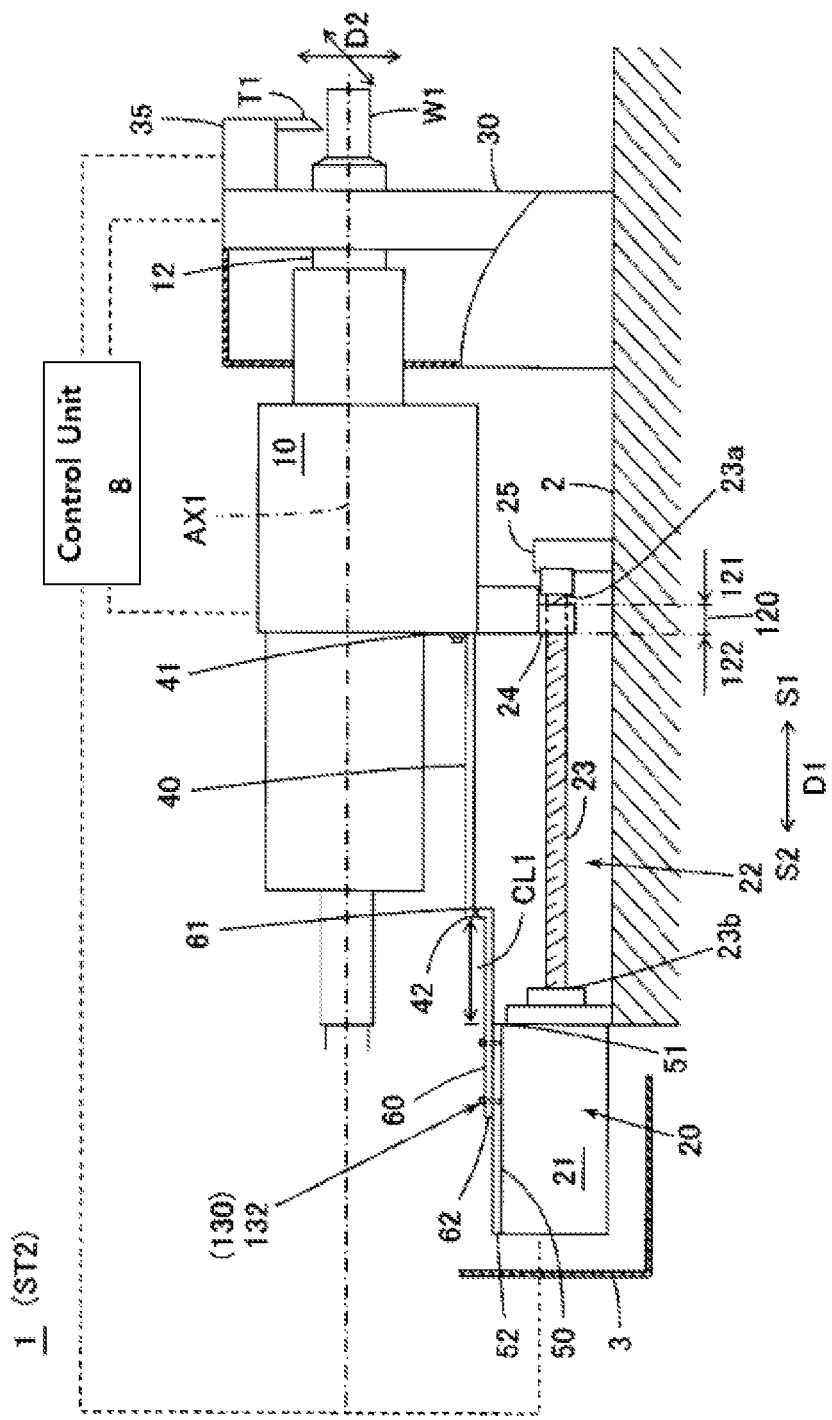
FIG. 4 is a partial sectional front view schematically showing part of a lathe when a spindle is in the most advanced position in the state that a guide bush is removed.

FIG. 1 to FIG. 4 each is a partial cross-sectional view schematically showing a configuration of the NC (numerical control) lathe 1 of sliding headstock type as an example of a machine tool. FIG. 1 shows part of the lathe 1 whose headstock 10 is in the most retracted position in the state the guide bush 32 is mounted on the supporting bed 30 (an example of the first use state ST1). The position of the spindle 12 when the headstock 10 is in the most advanced position is shown by a two-dot line. FIG. 2 shows part of the lathe 1 whose headstock 10 is in the most advanced position in the state that the guide bush 32 is mounted on the supporting bed 30. FIG. 3 shows part of the lathe 1 whose headstock 10 is in the most retracted position in the state the guide bush 32 is removed from the supporting bed 30 (an example of the second use state ST2). FIG. 4 shows part of the lathe 1 whose headstock 10 is in the most advanced position in the state that the guide bush 32 is removed from the supporting bed 30. The covers 50 and 60 each has an extended portions 50c and 60c (not shown). The drawings include the spindle axis AX1, a horizontal spindle axis direction D1 (an example of the moving direction), a front side S1 in the spindle axis direction D1, a rear side S2 in the spindle axis direction D1, and a diameter direction D2 perpendicular to the spindle axis direction D1. The drawings each only show an example for explanation and therefore the invention is not limited thereto. A positional relation between elements is only an example for explanation. The front and back direction may be replaced by the up and down direction or by an oblique direction. The rotational direction may be inversed. If something is the same as something in direction or position, they may be the same or almost the same within an error range.

Figure 5:
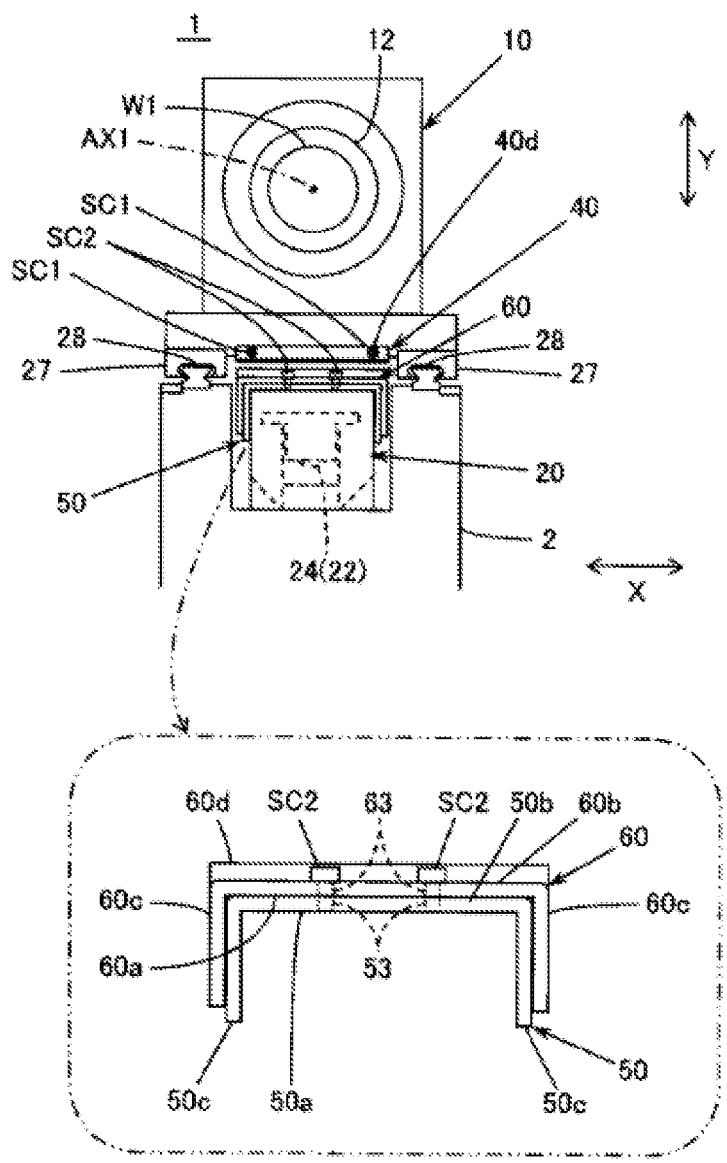
FIG. 5 is a side view schematically showing part of the lathe seen from the rear side in the spindle axis direction.
Figure 6:
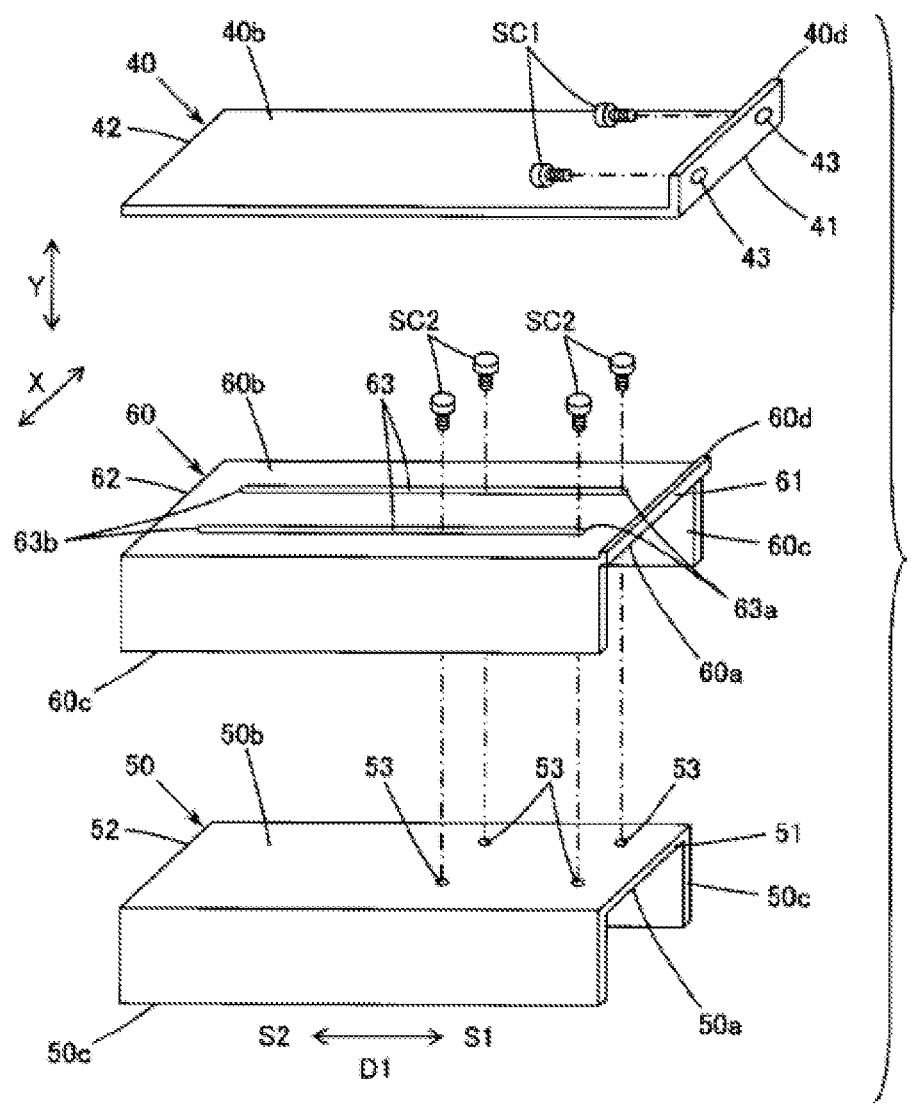
FIG. 6 is a perspective view schematically showing an example of a moving-side cover, a supporting-side cover, and a slide cover.

FIG. 5 schematically shows part of the lathe 1 viewed from the rear side S2 in the spindle axis direction D1. The diameter direction D2 may comprise the X-axis direction ant the Y-axis direction. The X-axis direction may be a horizontal direction perpendicular to the spindle axis direction D1. The Y-axis direction may be a vertical direction perpendicular to the spindle axis direction D1. FIG. 5 includes an expanded view of the supporting-side cover 50 and the slide cover 60. FIG. 6 schematically shows the moving-side cover 40, the supporting-side cover 50, and the slide cover 60. Another cover (not shown) may be provided to cover the driving apparatus 20 in a position in front of the headstock 10.

The lathe 1 as shown in FIG. 1 to FIG. 5 may comprise a bed 2 (an example of the supporting unit), a control unit 8, the headstock 10 (an example of the moving unit), the driving apparatus 20, the guide bush supporting bed 30, a tool post 35, and the covers 40, 50, and 60. The bed 2, which may be referred to as a table, may be a support for the headstock 10, the driving apparatus 20, the guide bush supporting bed 30 and others. A primary part of the bed 2, the headstock 10, the supporting bed 30, the tool post 35, and the tool T1 may be made of metal. The control unit 8 may comprise a RAM (Random Access Memory) storing an NC program, a ROM (Read Only Memory) storing an interpretive executing program for the NC program, a CPU (Central Processing Unit) executing the interpretive executing program, a timer circuit, and an interface. The control unit 8 may control operation of the headstock 10, the driving apparatus 20, the supporting bed 30, and the tool post 35 in accordance with the NC program.

The spindle 12 provided on the headstock 10 may releasably hold a cylindrical (bar) workpiece W1 inserted in the spindle axis direction D1. The workpiece W1 may be rotatable on the spindle axis AX1 extended along the longitudinal direction of the workpiece W1. A nut 24 (an example of the moving-side engaging member) of a ball screw 22 may be fixed to the headstock 10. A pair of guides 27 (FIG. 5) whose longitudinal direction is along the spindle axis direction D1 may be fixed to the headstock 10. The headstock 10 may be movable in the spindle axis direction D1.

The driving apparatus 20 mounted on the bed 2 may comprise a numerically controlled servo motor 21, a threaded shaft 23 extended in the spindle axis direction D1, and a pair of rails 28 (FIG. 5). Each of the rails 28 whose longitudinal direction is along the spindle axis direction D1 may be mounted on the bed 2. The guide 27 fixed on the headstock 10 may be engaged with the rail 28 slidably in the spindle axis direction D1. Two sets of a combination of the guide 27 and the rail 28 may be provided on both sides of the threaded shaft 23 in the X-axis direction. The guide may be mounted on the bed 2 and the rail may be mounted on the headstock 10.

A front end 23a of the threaded shaft 23 may be rotatably supported on an axis of the threaded shaft 23 by a front-end supporting member 25 provided on the bed 2. A rear end 23b of the threaded shaft 23 may be connected to the motor 21 via a coupling (not shown). The nut 24 may be engaged with the threaded shaft 23 movably in the spindle axis direction D1 via balls (not shown). The ball screw 22 may be a mechanical component comprising the threaded shaft 23 and the nut 24 operable via the balls. Rotation of the threaded shaft 23 on the spindle axis AX1 can move the nut 24 in the spindle axis direction D1. The motor 21 may drive the threaded shaft 23 in accordance with a command from the control unit 8. The headstock 10 along with the nut 24 may thereby move along the pair of rails 28 in the spindle axis direction D1.

As shown in FIG. 1 and FIG. 2, the guide bush 32 mounted on the supporting bed 30 may be arranged in front of the spindle 12 to slidably support the longitudinal workpiece W1 inserted in the spindle 12 in the spindle axis direction D1. The guide bush 32 may be rotated on the spindle axis AX1 in synchronization with the spindle 12. The guide bush 32 may be detachably attached to a through-hole penetrating the supporting bed 30 in the spindle axis direction. The guide bush prevents a bend of a long bar workpiece for higher precision machining. When the guide bush is used, the headstock 10 may be driven to move the spindle 12 in the spindle axis direction D1 in a first moving range 110 behind the guide bush 32. FIG. 1 to FIG. 4 shows the moving ranges 110 and 120 by using the position corresponding to the front end of the nut 24 as a reference only for illustrative convenience. When the guide bush 32 is used, a longer workpiece may be left uncut. Since the guide bush 32 supports the outer periphery of the workpiece W1, the workpiece W1 that has been machined cannot be retracted in the guide bush for another machining. As shown in FIG. 3 and FIG. 4, when the guide bush 32 is removed from the supporting bed 30, the spindle 12 can move in the spindle axis direction D1 in the second moving range 120 to work on the workpiece W1. The second moving range 120 when the guide bush is not used is on the further front side S1 compared to the first moving range 110 when the guide bush is used. The guide bush may not be limited to a rotatable guide bush, but a stationary type may be available.

The tool post 35 may be supported in front of the supporting bed 30 movably in the X-axis direction and the Y-axis direction. The tool post 35 may have a plurality of tools T1. The tool T1 may comprise a stationary tool including a non-rotatable turning tool and a rotary tool including a rotary drill. When the guide bush is used, the tool T1 may be applied to the workpiece W1 protruded from the guide bush 32. When the guide bush is not used, the tool T1 may be applied to the workpiece W1 protruded from the spindle 12. The tool post 35 may include a turret tool post and a gang tool post.

The covers 40, 50, and 60 may continuously cover the driving apparatus 20 provided behind the nut 24 in the spindle axis direction D1. The driving apparatus 20 having the motor 21 and the threaded shaft 23 may be directly or indirectly mounted on the bed 2.

The moving-side cover 40 may be fixed to the headstock 10 to cover part of the driving apparatus 20 including the threaded shaft 23 in the spindle axis direction D1. FIG. 6 includes a perspective view of the moving-side cover 40. The moving-side cover 40 may comprise a substantially horizontal base 40b and a bend 40d extended upwards from a front end 41. Instead, the moving-side cover 40 may have extended portions extended downwards from both ends of the base 40b in the X-axis direction in a position outside of extended portions 50c and 60c of the covers 50 and 60. The bend 40d may have a plurality of insertion holes 43 for screws SC1. The number of the insertion hole may not be limited to two, but a single hole or three or more holes may be available. There may be provided a threaded hole on the back side of the headstock 10. The screw SC1 inserted in the insertion hole 43 may be screwed to the threaded hole of the headstock 10. The moving-side cover 40 may be thereby attached to the back side of the headstock 10.

The supporting-side cover 50 may be fixed on the motor 21 in a position behind the front end 41 of the moving-side cover 40 in the spindle axis direction D1. FIG. 6 includes a perspective view of the supporting-side cover 50. The supporting-side cover 50 may comprise a substantially horizontal base 50b and extended portions 50c extended downwards from both ends of the base 50b in the X-axis direction. The base 50b and the extended portions 50c may form a groove 50b opened downwards whose longitudinal direction is along the spindle axis direction D1. The extended portion 50c may protect the driving apparatus 20 against cut chips entering from the X-axis direction. The base 50b may be provided with a threaded hole 53 to be engaged with the screw SC2. The screw SC2 may fasten the slide cover 60 onto the supporting-side cover 50 slidably in the spindle axis direction D1. As shown in FIG. 6, the base 50b may be provided with the two threaded holes 53 near the front end 51 and the two threaded holes 53 on the rear side S2 provided apart from the front threaded holes by a predetermined space to match two elongated holes 63 of the slide cover 60. The number of the threaded holes 53 may not be limited to four. Three or less or five or more holes may be available.

The slide cover 60 may be mounted on the supporting-side cover 50 (an example of the companion cover) slidably in the spindle axis direction D1 but in a non-detachable manner. FIG. 6 includes a perspective view of the slide cover 60. The slide cover 60 may comprise a substantially horizontal base 60b, extended portions 60c extended downwards from both ends of the base 60b in the X-axis direction, and a bend 60d extended upwards from a front end 61 of the base 60b. The base 60b and the extended portions 60c may form a groove 60a opened downwards whose longitudinal direction is along the spindle axis direction D1. The extended portion 60c may protect the driving apparatus 20 against cut chips entering from the X-axis direction.

The base 60b may be provided with the two elongated holes 63 for receiving the two screws SC2 arranged in the spindle axis direction D1. The screw SC2 may not be screwed to the elongated hole 63 but may only pass therethrough. The width of the elongated hole 63, which corresponds to the length in the X-axis direction, may be slightly longer than the diameter of a thread of the screw SC2. The elongated hole 63 may be formed to allow the received screws SC2 to be displaced in the spindle axis direction D1. The elongated hole 63 may be provided in a position overlapping the two threaded holes 53 arranged in the spindle axis direction D1 in planar view. The screws SC2 in the elongated hole 63 screwed to the two threaded holes 53 arranged in the spindle axis direction D1 prevents separation of the slide cover 60 from the supporting-side cover 50 and still allows the slide cover 60 to be displaced with respect to the supporting-side cover 50 in the spindle axis direction D1. The number of the elongated holes 63 may not be limited to two. A single or three or more holes may be available.

Figure 7:
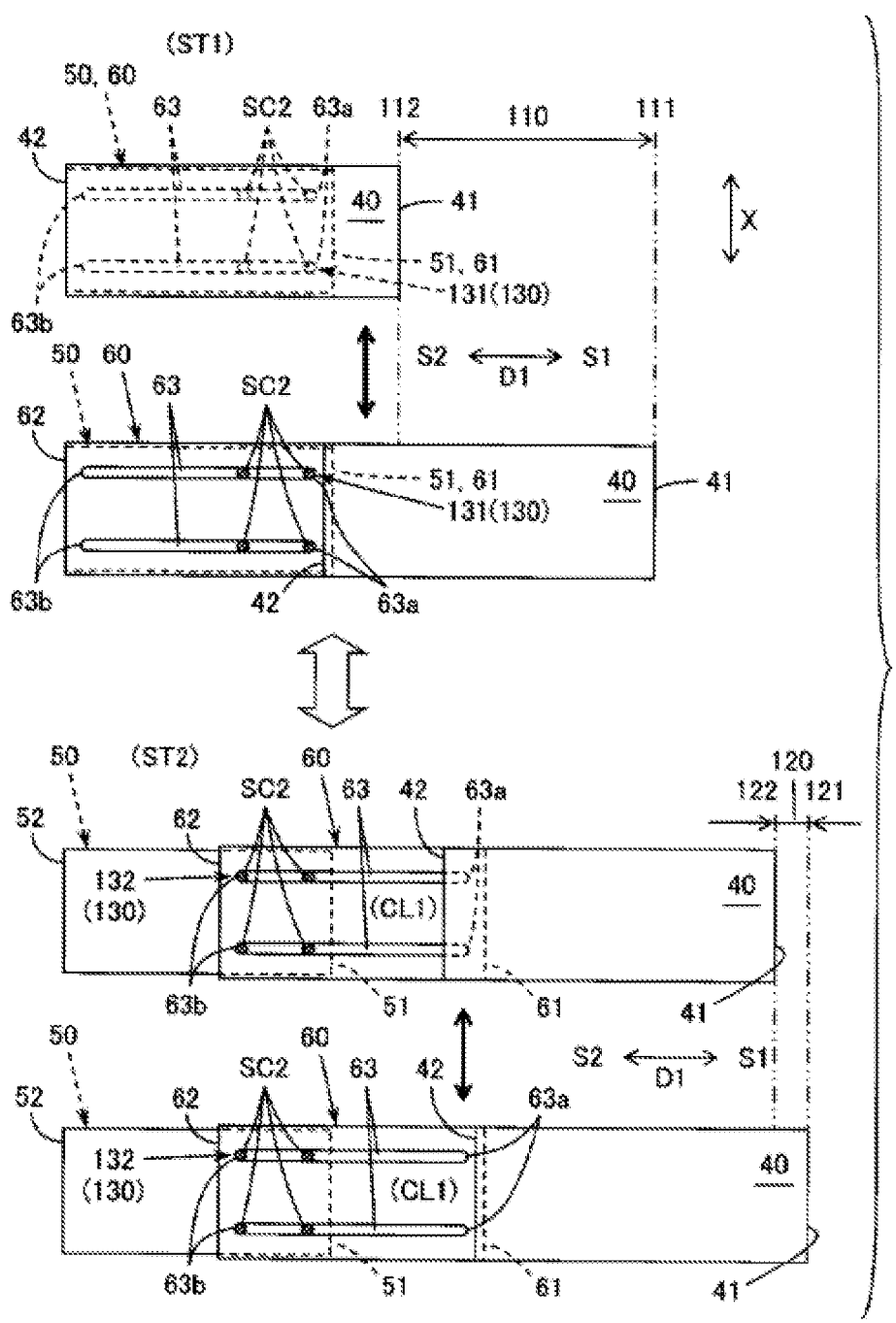
FIG. 7 is a planar view schematically showing an example of positional relationship of the moving-side cover, the supporting-side cover, and the slide cover.

FIG. 7 schematically shows positional relationship of the covers 40, 50, and 60 in planar view. The screw SC2 is viewed in section at a position of the elongated hole 63. The driving apparatus 20 (not shown in FIG. 7) may be arranged under the covers and in a position behind the covers in a planar view of FIG. 7. Only for convenience of illustration, the moving ranges 110 and 120 of the headstock 10 are shown based on the position corresponding to the front end 41 of the moving-side cover 40.

In the first use state ST1 that the guide bush 32 is used, as shown in an upper half of FIG. 7, the slide cover 60 may be screwed to the supporting-side cover 50 at a position where the front screw SC2 abuts against the front end 63a of the elongated hole 63. The elongated hole 63 of the slide cover 60 having the front end 63a, the front threaded screw 53 of the supporting-side cover 50 (FIG. 6), the screw SC2 screwed to the front threaded screw 53 may constitute a positioning structure 131 that positions the slide cover 60 in a position adapted to the first use state ST1. The upper half of FIG. 7 shows the position of the moving-side cover 40 when the headstock 10 is in the most retracted position (above) and when the headstock 10 is in the most advanced position (below). In the second use state ST2 that the guide bush 32 is not used, as shown in a lower half of FIG. 7, the slide cover 60 may be screwed to the supporting-side cover 50 at a position where the rear screw SC2 abuts against the rear end 63b of the elongated hole 63. The elongated hole 63 of the slide cover 60 having the rear end 63b, the rear threaded screw 53 of the supporting-side cover 50 (FIG. 6), the screw SC2 screwed to the rear threaded screw 53 may constitute a positioning structure 132 that positions the slide cover 60 in a position adapted to the second use state ST2. The lower half of FIG. 7 shows the position of the moving-side cover 40 when the headstock 10 is in the most retracted position (above) and when the headstock 10 is in the most advanced position (below). The positioning structures 131 and 132 may be collectively referred to as a positioning structure 130.

Being explained a positional relationship of the covers 40, 50, and 60 in the first use state ST1 that the guide bush 32 is used. In the upper half of FIG. 7, the front end 51 of the supporting-side cover 50 may be aligned with the front end 61 of the slide cover 60 in the spindle axis direction D1 while the rear end 52 of the supporting-side cover 50 may be aligned with the rear end 62 of the slide cover 60. The positional relationship of the covers 50 and 60 may not be limited thereto. The front ends 51 and 61 may be different in position and the rear ends 52 and 62 may be different in position as far as the covers 50 and 60 overlap to each other. The slide cover 60 is not drawn out from the supporting-side cover 50 toward the front. The front end 61 of the slide cover 60 therefore does not interfere with the headstock 10 (FIG. 1).

The moving-side cover 40 may move along with the headstock 10 in the first moving range 110 in the spindle axis direction D1 when the guide bush is used as shown in FIG. 1 and FIG. 2. FIG. 7 shows a retracted end 112 and an advanced end 111 of the first moving range 110 by using the front end 41 of the moving-side cover 40 as a reference. When the moving-side cover 40 moves within the first moving range 110, the supporting-side cover 50 may always be in a position behind the front end 41 of the moving-side cover 40. When the moving-side cover is positioned at the advanced end 111, the rear end 42 of the moving-side cover 40 may never be positioned in front of the front end 51 of the supporting-side cover 50. In the first use state ST1 that the guide bush is used, the both covers 40 and 50 may continuously cover part of the driving apparatus 20 in the spindle axis direction D1.

When the guide bush is not used, the guide bush 32 may be removed from the through-hole of the supporting bed 30 and then the headstock 10 may be advanced to let the spindle 12 into the through-hole as shown in FIG. 3 and FIG. 4, which forms a clearance CL1 between the front end 51 of the supporting-side cover 50 and the rear end 42 of the moving-side cover 40 in the spindle axis direction DE If the front end 51 of the supporting-side cover 50 is extended forwards, the headstock 10 would interfere with the extended front end 51 when moved rearwards (FIG. 1). If the rear end 42 of the moving-side cover 40 is extended rearwards to close the clearance CL1, a housing 3 is necessarily displaced to the rear side S2 to prevent interference with the extended rear end 42 of the moving-side cover 40 when the guide bush is used (FIG. 1 and FIG. 2), which necessarily increases the size of the machine in the spindle axis direction D1. In this embodiment, the slide cover 60 mounted on the supporting-side cover 50 may be drawn out to the front side S1 to close the clearance CL1 between the moving-side cover 40 and the supporting-side cover 50.

Being explained a positional relationship of the covers 40, 50, and 60 in the second use state ST2 that the guide bush 32 is not used. In the lower half of FIG. 7, the front end 61 of the slide cover 60 may be in a position in front of the front end 51 of the supporting-side cover 50. The rear end 62 of the slide cover 60 may be in a position between the front end 51 and the rear end 52 of the supporting-side cover 50. The supporting-side cover 50 and the slide cover 60 drawn out therefrom to the front side may continuously cover part of the driving apparatus 20 in the spindle axis direction DE Part of the slide cover 60 drawn out from the supporting-side cover 50 may be in a position covering the part of the driving apparatus 20 that falls in a range between the supporting-side cover 50 and the moving-side cover 40.

The moving-side cover 40 may move along with the headstock 10 in the spindle axis direction D1 within the second moving range 120 when the guide bush is not used as shown in FIG. 3 and FIG. 4. The second moving range 120 may be in a position in front of the first moving range 110. FIG. 7 shows a retracted end 122 and an advanced end 121 of the second moving range 120 by using the front end 41 of the moving-side cover 40 as a reference. The headstock 10 would not interfere with the front end 61 of the slide cover 60 when moved to the rear side (FIG. 3). When the moving-side cover 40 is positioned at the advanced end 121, the rear end 42 of the moving-side cover 40 is never in a position in front of the front end 61 of the slide cover 60. In the second use state ST2 that the guide bush is not used, the slide cover 60 drawn out from the supporting-side cover 50 to the front side may close the clearance CL1 between the supporting-side cover 50 and the moving-side cover 40. The covers 40, 50, and 60 may continuously cover part of the driving apparatus 20 in the spindle axis direction D1.

(3) Method of Switching the Use States

A method of switching the guide bush use states is being explained.

First, the operator may attach the guide bush 32 to the supporting bed 30 as shown in FIG. 1 and FIG. 2. Then, the operator may loosen the four screws SC2 screwed to the supporting-side cover 50 to bring the slide cover 60 to the rear side S2 with respect to the supporting-side cover 50. When the front end 63a of the elongated hole 63 abuts against the front screw SC2, the slide cover 60 may be in a position adapted to the first use state ST1 that the guide bush is used. Under the state that the slide cover 60 is in the position adapted to the first use state ST1, the operator may screw the four screws SC2 to the supporting-side cover 50. The slide cover 60 is not necessarily removed from the supporting-side cover 50 during this procedure.

In order to switch the first use state ST1 that the guide bush 32 is used to the second use state ST2 that the guide bush 32 is not used, the operator may remove the guide bush 32 from the supporting bed 30 as shown in FIG. 3 and FIG. 4. Then, the operator may loosen the four screws SC2 screwed to the supporting-side cover 50 to bring the slide cover 60 to the front side S1 with respect to the supporting-side cover 50. When the rear end 63b of the elongated hole 63 abuts against the rear screw SC2, the slide cover 60 may be in a position adapted to the second use state ST2 that the guide bush is not used. Under the state that the slide cover 60 is in the position adapted to the second use state ST2, the operator may screw the four screws SC2 to the supporting-side cover 50. The slide cover 60 is not necessarily removed from the supporting-side cover 50 during this procedure.

(4) Effect of the Embodiment

As described above, in the first use state ST1 that the headstock 10 moves in the first moving range 110 to machine the workpiece W1, the slide cover 60 may be displaced to the rear side S2 and then fastened to the supporting-side cover 50. Accordingly, the part of the driving apparatus 20 behind the nut 24 can be continuously covered by the supporting-side cover 50 and the moving-side cover 40 when the guide bush is used. In the second use state ST2 that the headstock 10 moves in the second moving range 120, the slide cover 60 may be displaced to the front side S1 to be fastened to the supporting-side cover 50. The slide cover 60 drawn out from the supporting-side cover 50 to the front side can close the clearance CL1 formed between the supporting-side cover 50 and the moving-side cover 40 when the guide bush is not used. Accordingly, the part of the driving apparatus 20 behind the nut 24 can be continuously covered by the supporting-side cover 50, the slide cove 60, and the moving-side cover 40.

The part of the driving apparatus 20 behind the nut 24 is thereby protected against cut chips scattered from the workpiece W1 for improved safety. Furthermore, the slide cover 60 positionally variable with respect to the supporting-side cover 50 according to the use states ST1 and ST2 can decrease the length of the supporting-side cover 50 and the moving-side cover 40 in the spindle axis direction D1. The embodiment can therefore decrease the machine dimensions in the spindle axis direction D1.

Switching the first use state ST1 that the guide bush 32 is used to the second use state ST2 that the guide bush 32 is not used only requires a simple operation drawing the slide cover 60 out from the supporting-side cover 50. Switching the second use state ST1 to the first use state ST1 only requires a simple operation overlapping the slide cover 60 on the supporting-side cover 50. The slide cover 60 is not necessarily removed from the supporting-side cover 50 and not necessarily attached thereto in either case. The embodiment facilitates the work of switching the moving ranges of the headstock 10.

Furthermore, the supporting-side cover 50 and the slide cover 60 may have the positioning structure 131 that positions the slide cover 60 in a position adapted to the first use state ST1 and the positioning structure 132 that positions the slide cover 60 in a position adapted to the second use state ST2. In switching the first use state ST1 and the second use state ST2, the slide cover 60 can be readily positioned with respect to the supporting-side cover 50. The embodiment facilitates the work of switching the moving ranges of the headstock 10.

(5) Modifications

The invention may be implemented in a variety of embodiments. In the embodiment described above, the slide cover 60 may have the elongated hole 63 and the supporting-side cover 50 may have the threaded hole 53 receiving the screw SC2. Instead, the slide cover 60 may have a threaded hole receiving the screw SC2 and the supporting-side cover 50 may have an elongated hole. The screw SC2 may pass through the elongated hole of the supporting-side cover 50 to be screwed to the threaded hole of the slide cover 60. Only loosening the screw SC2 allows the slide cover 60 to slide in the spindle axis direction D1 with respect to the supporting-side cover 50 without detaching the slide cover. The modified embodiment facilitates the work of switching the moving ranges of the headstock. The slide cover 60 may be slidably mounted on an upper surface of the supporting-side cover 50. Instead, the slide cover 60 may be slidably mounted on a lower surface of the supporting-side cover 50.

In the embodiment described above, the companion cover of the slide cover 60 may be the supporting-side cover 50. Instead, the companion cover may be the moving-side cover 40. Though the slide cover 60 moving along with the headstock increases the weight of the moving unit, the modification still facilitates the work of switching the moving ranges of the headstock.

In the embodiment described above, the driving apparatus 20 provided behind the headstock 10 may be protected by the covers 40, 50, and 60. Instead, the driving apparatus 20 provided in front of the headstock 10 may be protected by the covers. The moving-side cover may be mounted in front of the headstock 10 and the supporting-side cover may be mounted on the front-end supporting member 25. The slide cover may be mounted on the supporting-side cover slidably in the spindle axis direction D1. The driving apparatus 20 provided in front of the headstock 10 can be thereby protected by the covers.

The driving apparatus may not be limited to a driving apparatus using a ball screw. The available driving apparatus may include a driving apparatus using a linear motor and a driving apparatus using a rack gear. The invention may be applied to a guide device for guiding the moving unit in the spindle axis direction D1 with respect to the supporting unit. In order to cover the rail 28 (part of the driving apparatus) as shown in FIG. 5, the moving-side cover may be provided on the headstock 10 and the supporting-side cover having the slide cover may be mounted on the bed 2. In the first use state ST1, the supporting-side cover and the moving-side cover may continuously cover part of the position of the rail 28. In the second use state ST2, the supporting-side cover, the slide cover, and the moving-side cover may continuously cover part of the rail 28.

The moving unit may not be limited to the headstock. The invention may be applied to the tool post having different moving ranges according the first use state for front machining and the second use state for back machining. In the first use state, the supporting-side cover and the moving-side cover may continuously cover part of the position of the driving apparatus. In the second use state, the supporting-side cover, the slide cover, and the moving-side cover may continuously cover part of the driving apparatus. The invention may be applied to another machine tool but a lathe.

Figure 8A:
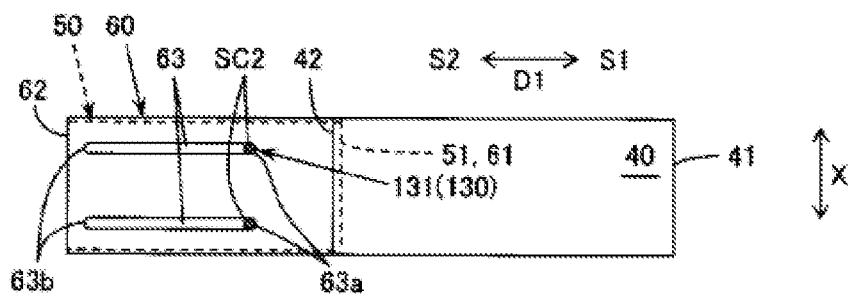
FIG. 8A and FIG. 8B is a planar view schematically showing an example of the moving-side cover, the supporting-side cover, and the slide cover.
Figure 8B:
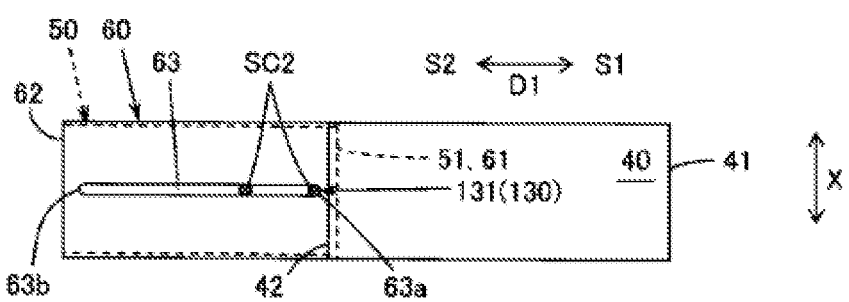
Figure 8C:
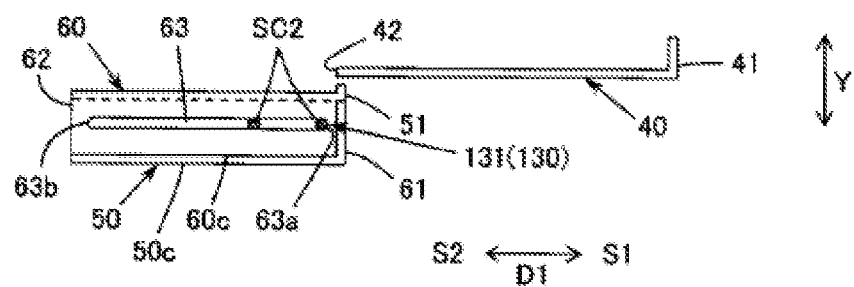
FIG. 8C is a front view schematically showing an example of the moving-side cover, the supporting-side cover, and the slide cover.

As shown in FIG. 8A to FIG. 8C, the combination of the elongated hole 63 and the screw SC2 may have variations. Any unit or member similar to the embodiment described above is being similarly denoted. FIG. 8A shows an embodiment of a single screw SC2 in each elongated hole 63. The supporting-side cover 50 may have a threaded hole to be engaged with the screw SC2. The slide cover 60 may be precisely brought in a position adapted to the first use state by abutting the screw SC2 against the front end 63a of the elongated hole and in a position adapted to the second use state by abutting the screw SC2 against at the rear end 63b of the elongated hole.

FIG. 8B shows an embodiment of two screws SC2 in a single elongated hole 63. The supporting-side cover 50 may have a threaded hole to be engaged with each screw SC2. In this embodiment also, the slide cover 60 may be precisely brought in a position adapted to the first use state and the second use state.

FIG. 8C shows an embodiment of the elongated hole 63 formed in the extended portion 60c of the slide cover 60. The threaded hole to be engaged with each screw SC2 may be formed in the extended portion 50c of the supporting-side cover 50. In this embodiment also, the slide cover 60 may be precisely brought in a position adapted to the first use state and the second use state. In FIG. 8A to FIG. 8C, the supporting-side cover 50 may have an elongated hole while the slide cover 60 may have a threaded hole to be engaged with the screw SC2.

Figure 9A:
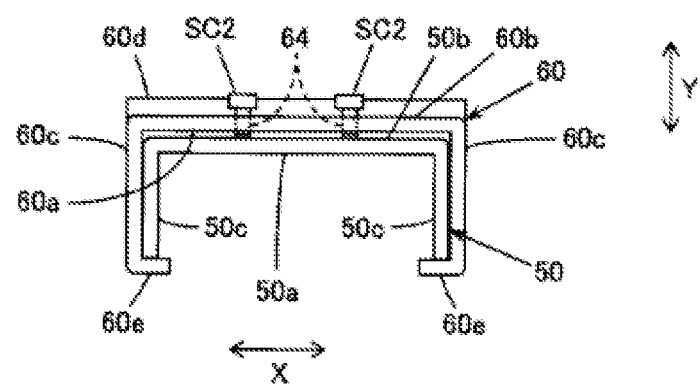
FIG. 9A and FIG. 9B are side views schematically showing an example of the moving-side cover, the supporting-side cover, and the slide cover.
Figure 9B:
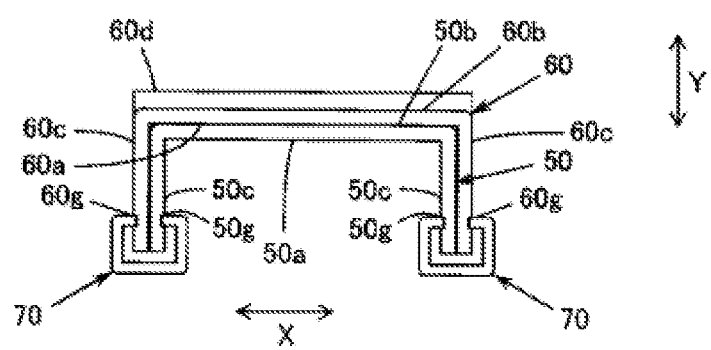

As shown in FIG. 9A and FIG. 9B, the slide cover may be slidably mounted on the companion cover even without the elongated hole 63. Any unit or member similar to the embodiment described above is being similarly denoted. FIG. 9A shows the supporting-side cover 50 not provided with a threaded hole 53 and the slide cover 60 provided with threaded holes 64 and a pair of receiving parts 60e. No elongated hole may be formed in the slide cover 60. Each threaded hole 64 may be engaged with each screw SC2. The pair of receiving parts 60e may be extended closer to each other in the X-axis direction from an end of the extended portion 60c. The threaded hole 64 may always be engaged with the screw SC2. Fastening the screw may push the base 50b of the supporting-side cover 50 to the extending direction of the extended portion 50c. The front end of the extended portion 50c thereby pushed may be brought into the receiving part 60e.

When the guide bush 32 is used, the operator may loosen each screw SC2 screwed to the slide cover 60, bring the slide cover 60 to the rear side S2 to reach the position adapted to the first use state ST1 with respect to the supporting-side cover 50, and then fasten each screw SC2. When the guide bush 32 is not used, the operator may loosen each screw SC2 screwed to the slide cover 60, bring the slide cover 60 to the front side S1 to reach the position adapted to the second use state ST1 with respect to the supporting-side cover 50, and then fasten each screw SC2. In any case, there may be no need of removing the slide cover 60 from the supporting-side cover 50. The supporting-side cover 50 may have a recess and the slide cover may have a projection to be slidably engaged with the recess. The recess and the projection may constitute a positioning structure 130 (not shown). The embodiment still has the effect of facilitating the work of switching the moving ranges of the headstock even without such positioning structure.

FIG. 9B shows an example of a clamping member 70 used to fasten the slide cover 60 to the supporting-side cover 50. The slide cover 60 may have no elongated hole. The supporting-side cover 50 may have no threaded hole. The clamping member 70 may be provided for each of the combinations of the extended portion 50c of the supporting-side cover 50 and the extended portion 60c of the slide cover 60. The clamping member 70 may apply force to the extended portions 50c and 60c to push to each other in the X-axis direction, thereby fastening the slide cover 60 to the supporting side cover 50. To slidably fasten the slide cover 60 to the supporting-side cover 50 in the spindle axis direction D1, the extended portion 50c may be provided with a groove 50g receiving one end of the clamping member 70 while the extended portion 60c may be provided with a groove 60g receiving the other end of the clamping member 70. The groove 50g of the supporting-side cover 50 may extend in the spindle axis direction D1 with respect to the inner side surface of the extended portion 50c. The groove 60g of the slide cover 60 may extend in the spindle axis direction D1 with respect to the outer side surface of the extended portion 60c. Accordingly, only applying force of the spindle axis direction D1 to the slide cover 60 would slide the slide cover 60 with respect to the supporting-side cover 50. Without the force being applied, the slide cover can be stationary with respect to the supporting side cover 50 by pressing force of the clamping member 70.

Furthermore, the ends of the groove 50g and 60g and the clamping member 70 may constitute the positioning structure 130 (not shown). The embodiment still has the effect of facilitating the work of switching the moving ranges of the headstock even without such positioning structure.

(6) Conclusion

As described above, the invention provides a machine tool capable of facilitating the work of switching the moving ranges of the headstock in a variety of embodiments. The essential operations and effects of the invention may be available even from only the elements of independent claims. The elements disclosed in the embodiments may be mutually replaced or the combination thereof may be changed. The disclosed elements may be mutually replaced by prior art of the combination thereof may be changed. Such replacement and change may be within the scope of the invention.

What is claimed is:
1. A machine tool comprising:
   a driver provided on a supporting unit, the driver having a supporting-side engaging member provided along a moving direction of a moving unit, and
   a moving-side engaging member provided on the moving unit movably in the moving direction to be engaged with the supporting-side engaging member,
   wherein the moving unit moves in the moving direction to machine a workpiece in a first moving range in a first use state and in a second moving range different from the first moving range in a second use state,
   the machine tool further comprising:
   a moving-side cover provided on the moving unit to cover part of a position of the driver in the moving direction;
   a supporting-side cover provided in a position on a side of the first moving range of an end of the moving-side cover on a side of the second moving range in the moving direction to continuously cover the part of the position of the driver in the moving direction in cooperation with the moving-side cover in the first use state, the supporting-side cover forming a clearance in the moving direction with respect to the moving-side cover in the second use state;

a slide cover mounted on a companion cover slidably in the moving direction to close the clearance when slidably drawn out in the moving direction from the companion cover in the second use state, the companion cover being one of supporting-side cover and the moving-side cover;

a first positioning structure which positions the slide cover in a position adapted to the first use state when the slide cover slides in the moving direction with respect to the companion cover; and a second positioning structure which positions the slide cover in a position adapted to the second use state when the slide cover slides in the moving direction with respect to the companion cover.

2. The machine tool of claim 1, wherein the companion cover is the supporting-side cover.

3. The machine tool of claim 2, wherein the moving unit is provided with a spindle rotatable along with the workpiece on a spindle axis along the moving direction, the machine tool further comprising a supporting bed provided in front of the spindle to detachably hold a guide bush slidably supporting the workpiece, wherein the first use state is a state that the guide bush is mounted on the supporting bed, the second use state is a state that the guide bush is removed from the supporting bed, and the second moving range is nearer the supporting bed than the first moving range is.

4. The machine tool of claim 1, wherein the slide cover is positioned in one of the position adapted to the first use state and the position adapted to the second use state when the slide cover slides in the moving direction with respect to the companion cover.

5. The machine tool of claim 4, wherein the moving unit is provided with a spindle rotatable along with the workpiece on a spindle axis along the moving direction, the machine tool further comprising a supporting bed provided in front of the spindle to detachably hold a guide bush slidably supporting the workpiece, wherein the first use state is a state that the guide bush is mounted on the supporting bed, the second use state is a state that the guide bush is removed from the supporting bed, and the second moving range is nearer the supporting bed than the first moving range is.

6. The machine tool of claim 1, wherein the moving unit is provided with a spindle rotatable along with the workpiece on a spindle axis along the moving direction, the machine tool further comprising a supporting bed provided in front of the spindle to detachably hold a guide bush slidably supporting the workpiece, wherein the first use state is a state that the guide bush is mounted on the supporting bed, the second use state is a state that the guide bush is removed from the supporting bed, and the second moving range is nearer the supporting bed than the first moving range is.

* * * * *